United States Patent [19]

Holroyd et al.

[11] 4,057,447
[45] Nov. 8, 1977

[54] MANUFACTURE OF PNEUMATIC TIRES

[75] Inventors: Eric Holroyd, High Legh Park, near Knutsford; Anthony Gerald Goodfellow, Maghull, near Liverpool; James Neil McGlashen, Winstanley, near Wigan, all of England

[73] Assignee: Dunlop Limited, England

[21] Appl. No.: 619,461

[22] Filed: Oct. 3, 1975

Related U.S. Application Data

[63] Continuation of Ser. No. 348,654, April 6, 1973, abandoned.

[30] Foreign Application Priority Data

Apr. 6, 1972 United Kingdom .............. 15787/72

[51] Int. Cl.² .......................................... B29H 17/00
[52] U.S. Cl. ..................................... 156/125; 264/85; 264/94; 264/248; 264/326; 264/335
[58] Field of Search .................... 264/93, 94, 85, 326, 264/315, 96, 98, 335, 336, 248, 261, 277, 294, 297; 156/125, 129, 147, 145, 156, 228, 285, 287, 311, 110 R

[56] References Cited

U.S. PATENT DOCUMENTS

| | | | |
|---|---|---|---|
| 1,332,812 | 3/1920 | Day | 264/335 |
| 1,346,848 | 7/1920 | Roberts | 264/96 X |
| 1,400,146 | 12/1921 | Eggers et al. | 264/96 X |
| 2,710,425 | 6/1955 | Rhodes | 264/326 X |
| 2,726,925 | 12/1955 | Saulino | 264/248 X |
| 3,427,213 | 2/1969 | Alderfer | 264/248 X |
| 3,458,373 | 7/1969 | Knipp et al. | 156/125 |
| 3,472,715 | 10/1969 | Weinbrenner et al. | 264/248 X |
| 3,825,457 | 7/1974 | Holroyd et al. | 264/297 X |

FOREIGN PATENT DOCUMENTS

| | | |
|---|---|---|
| 2,114,604 | 6/1972 | France. |
| 2,132,430 | 4/1972 | France. |
| 962,563 | 7/1964 | United Kingdom. |

Primary Examiner—Jan H. Silbaugh
Attorney, Agent, or Firm—Stevens, Davis, Miller & Mosher

[57] ABSTRACT

A method for making tires. The tire is first formed in two or more parts from uncured rubber, in mould cavities provided with locking sprues to retain the moulded tire part in a desired section of the moulding. The mould is pressurized, at least when moulding the tire sidewalls, then opened and the moulded uncured tire parts carried in parts of the mould are brought together and joined under heat and pressure.

17 Claims, 10 Drawing Figures

MANUFACTURE OF PNEUMATIC TIRES

This is a Continuation of application Ser. No. 348,654 filed Apr. 6, 1973 now abandoned.

This invention relates to the manufacture of pneumatic tires.

The invention provides a method for the manufacture of a pneumatic tire comprising beads, sidewalls and a tread portion in which the tire is first formed in at least two parts, each part being moulded in a mould cavity from rubber in an uncured state and being provided with a locking sprue to maintain the part in a desired part of the mould, the mould is pressurized, at least when moulding the sidewalls, and opened and the parts of the tire are then brought in contact by means of the mould parts in which they are carried, and joined together under heat and pressure.

Preferably the pneumatic tire is manufactured in at least three parts comprising two sidewalls and a tread portion. Bead cores may be included in the sidewalls, together with rubber bead apices and cord or fabric or other sidewall reinforcements, if desired which may be positioned in the mould cavity prior to forming the sidewalls. Similarly the tread portion may include a breaker or other reinforcement of, e.g. textile cord fabric, steel cord fabric or high modulus polymeric material, which may be assembled or preformed around a core prior to forming of the tread portion.

If desired in one or more parts of the tire a reinforcement may be provided which extends out of that tire part. The tire part is moulded leaving a free flap of reinforcement extending from it. This free flap of reinforcement is held out of the way while its associated tire part is brought in contact with an adjacent tire part and is subsequently itself pressed into contact with the adjacent tire part to bridge the junction between the parts, before the rubber is cured.

The rubber may be any elastomeric cross-linkable polymeric material, for example natural rubber, butyl rubber, SBR, neoprene, ethylene-propylene rubber and nitrile rubber or mixtures thereof. The type of rubber used will of course depend on the desired properties of the finished tire and the selection and compounding of a suitable rubber for any particular purpose is a well-known procedure in the field of rubber technology.

Although the rubber is to be substantially uncured when used to form the parts of the tire it is preferred to subject it to a certain amount of working prior to the forming steps in order to destroy its "nerve" or "memory". Suitable working may be, for example, by milling, extrusion or other mechanical or heat treatment but should not be sufficient to start the rubber on its curing cycle. In other words, although the rubber may have been subjected to a certain amount of energy, it is still substantially uncured when used to form the tire parts.

This may be arranged provided that careful attention is paid to the rheometer plot of cure rate vs temperature for the rubber compound used. In general this plot is a curve showing an initial plateau where rate of cure is very low, then a rapid acceleration of the cure rate once a certain temperature, the "threshold" temperature, is reached. In the present invention where the rubber compound has a curve of this kind the temperature of the compound is preferably kept below this threshold temperature at all times during the working, moulding and joining stages and is then heated to above this temperature when curing is to be carried out.

The mould or moulds used in forming the parts may be conveniently pressurized by the introduction of compressed air or other suitable gas, e.g. nitrogen. It is preferred to pressurize by at least 5 pounds per square inch (p.s.i.) but considerably higher pressures may be used if desired.

It will normally be convenient to pressurize the mould by allowing the gas under pressure to enter over the equator of the mould cavities. However, if male formers are used in conjunction with the mould cavities, it may in certain applications be advantageous to introduce the gas through the male formers, e.g. at their poles.

The pressurization of the mould is preferably commenced before opening the moulds for the various parts of the tire and maintained until the parts have been joined and either cooled or cured (if desired the parts after joining may be cooled before the curing has been completed). The pressurization serves to prevent gassing off from the warm compound after moulding and, particularly in moulding the sidewalls acts in conjunction with the locking sprue to keep the moulded part in the correct part of the mould for the joining to be carried out. It will be noted that gassing off from the warm compound is particularly undesirable since it gives rise to ugly pitting of the surface of the moulded tire part and gives rise to porosity in the finished product which can lead to structural failure to the tire in use.

In a further embodiment the invention provides a moulding apparatus comprising at least two mould cavities, means to form moulded parts of a pneumatic tire of rubber in those cavities, the cavities being provided with locking sprue grooves to prevent displacement of the halves, means to pre-work the rubber without any substantial curing prior to its being formed, means to pressurize the mould with gas and means to bring the cavities carrying the tire parts together to join the respective parts together.

The moulding of the tire parts into the mould cavities may be carried out in any convenient manner. For example, male-plug forming, vacuum-forming and combinations of these two techniques may be used for sheet materials. Moreover, the moulding may be carried out by compression, transfer or injection moulding techniques.

The means to pre-work the rubber prior to forming may conveniently to the injection screw of an injection mould or the transferring action of a transfer mould. A combination of the two techniques can be employed whereby a transfer chamber is supplied by a relatively low-temperature screw. For this reason compression moulding alone is not preferred for the method of the invention but it can be satisfactory if the rubber can be "worked" to the desired degree prior to being charged into the compression mould.

The locking sprues will be so shaped as to resist movement of the tire parts in the mould, for example, due to shrinkage or to removal of male formers when the latter are used. The locking sprue is preferably also shaped to ensure that the compressed gas entering the mould during pressurization passes over the lip and onto the surface of the mould half which is to be stripped from its corresponding tire part but does not enter between the tire part and the wall of the moulding cavity on which the tire part is to be carried. This latter effect is in the least undesirable since it causes blistering or similar blemishes on the product and can result in quite unsatisfactory products but it may result in the tire part being lifted out of the moulding cavity on which it should be carried.

A particularly convenient form of locking sprue is one which consists of a thicker portion connected to the half of the article by a thinner portion. Examples of suitable locking sprues are shown in FIGS. 1, 2 and 3 of the accompanying drawings and are described more fully below.

In the case where a tire is to be moulded in three parts, a tread portion, possibly including a breaker assembly, and two sidewalls, the moulding of all of the parts, i.e. the sidewalls and the tread portion, may be carried out using a special locking sprue and mould pressurization as described above. Alternatively in the moulding of the tread portion a part of the tread pattern moulded on the tread portion may be utilized to act as the locking sprue, similarly the former on which the tread portion is moulded may be collapsible or alternatively may be a flat ring which may carry a packing strip e.g. of cured non-adhesive rubber to shape the inner profile of the tread ring. In the former case the tread former may remain inside the tread portion until after the joining stage and the litter case the tread former ring may be slid out of the tread portion laterally before the joining stage.

Pressurization of the tread mould is not essential but pressurization is, however, preferred to maintain intimate contact between the tread portion and the tread moulding matrix, and to prevent gassing off from the warm moulded tread rubber.

The method of the invention enables uncured tire parts to be formed and then brought together without damage. If these uncured parts were formed without the steps of the present invention they would be very susceptible the damage and dislodgement. For example, the uncured parts would tend to stick to male formers as the latter were removed thereby resulting in unsatisfactory moulding. The method of the invention overcomes these difficulties as explained more fully below and enables satisfactory, unblemished tires to be achieved from substantially uncured parts. Prior methods of moulding tires in two or more parts have usually required at least partial curing of at least one of the parts to prevent their being damaged. These partially cured parts cannot then be satisfactorily joined together unless adhesive is used. The present invention eliminates all these difficulties and extra steps.

A further advantage is that because the tire parts are brought together by means of the mould parts before any curing has commenced, they will be amenable to joining together i.e. the desired article can be formed, with a relatively low degree of interference. The amount of interference is adjusted by means of the allowance of rubber in the tire parts which is made to make sure that the joining surfaces of the parts of the tire carried by the mould parts intimately contact when the mould parts are brought together. It will be appreciated that excess interference at the formation of the joint could result in an unacceptable product, since excess interference at this time can cause undesirable wall-thickening in the area of the joint.

As indicated above, where uncured rubber parts are moulded, there will be a very strong tendency for them to be displaced or torn before they can be joined together, for example, they will tend to stick to the male formers when the latter are removed. Thus the positive means i.e. locking sprues, of retaining the halves in their respective cavities which are provided by this invention are very important. This technique can be further assisted by coating the part of the mould which is to be stripped from the moulded uncured tire part with a suitable non-stick material, e.g. poly(tetrafluoroethylene) and by roughening the part of the mould on which the tire part is to be carried. The roughening may be carried out e.g. by shot-blasting.

The invention is illustrated, by way of example only, in the accompanying drawings in which.

Figure 1:
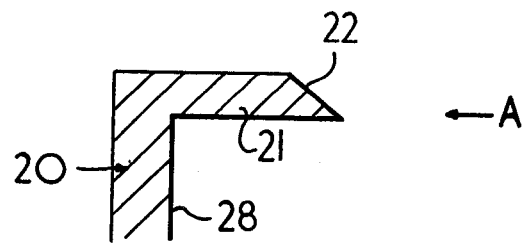
FIGS. 1, 2 and 3 are cross-sections through examples of suitable shaped sprues.

In FIG. 1 a moulded tire part 20 (illustrated schematically) is formed having a sprue 21. Sprue 21 has a cut-away surface 22 so inclined that pressurized gas introduced into the mould in the direction of arrow A, will deflect over the cut-away surfaces and thereby will not get between the moulded part and the surface of the mould itself, i.e. the tendency for the gas to get between surface 28 i.e. the exterior of the finished product, of the moulded part and the surface of the mould itself is effectively reduced.

Figure 2:
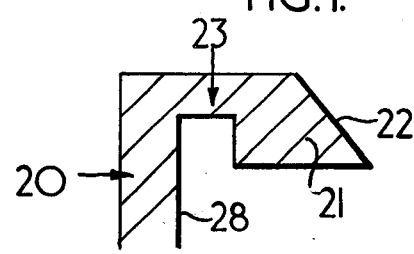

In FIG. 2 is shown a differently shaped sprue. This sprue is connected to the moulded tire part 20 by means of a narrow moulded portion or neck 23. Trimming of the finished moulded product is made easier by virtue of this narrow portion 23. Again the sprue has a cut-away surface 22 to control the flow of gas into the moulding.

Figure 3:
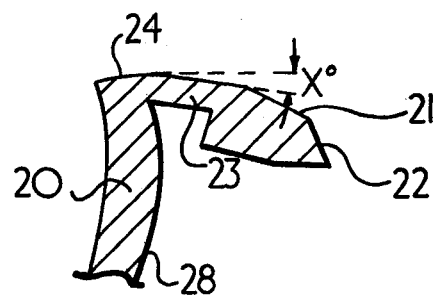

FIG. 3 shows a particularly preferred type of sprue. This has all the features of the sprue of FIG. 2 but has been formed at a small angle X° from the normal with the moulded part. X° can conveniently be up to 45°. By this means the two sprues are prevented from joining together when the parts are joined together at surface 24.

Joining together of the two sprues may cause undesirable joint deformation.

Figure 4A:
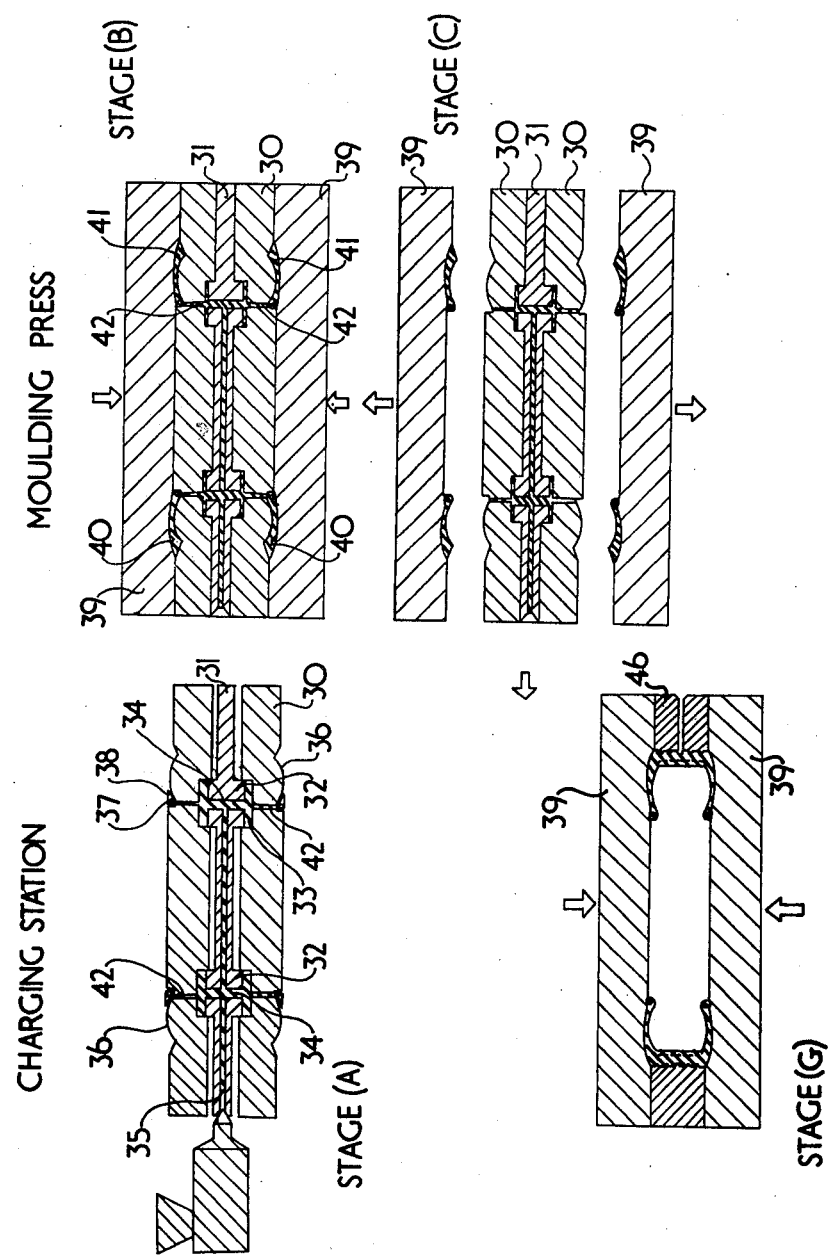
FIG. 4 shows schematically a process and apparatus for the manufacture of a pneumatic tire.
Figure 4B:
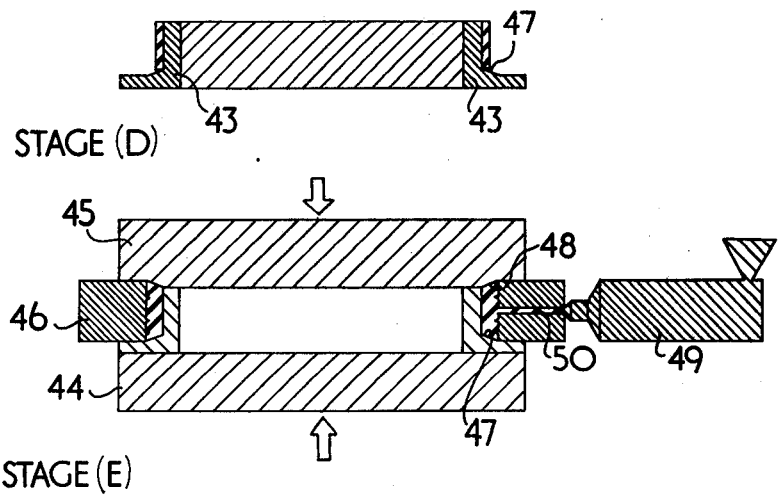
Figure 4B:
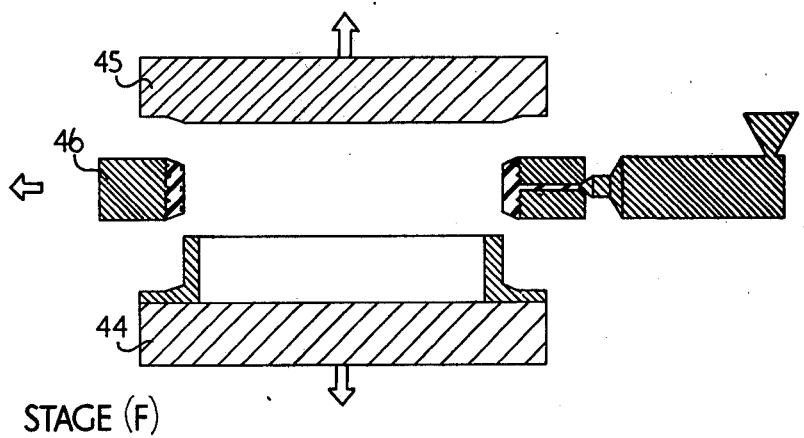

FIG. 4 illustrates schematically the stages of an operation of process and apparatus for making a tire. FIG. 4a showing the moulding of the tire sidewalls and joining the sidewalls to the tread, and FIG. 4b showing the moulding of a tread portion. As shown, at Stage (A) a pair of sidewall units 30 are assembled on either side of a centre platen 31. The platen 31 has annular raised portions 32 the sidewall units each having a corresponding groove 33 of slightly greater depth.

The platen 31 contains passages 34 from an inlet 35 connected to a screw-injector to the surface of the platen at the center of the raised annular portions, and the sidewall units 30 each contain passages 42 from the groove 33 to a moulding face 36 shaped to form part of a moulding cavity for a tire sidewall.

In operation the sidewall units 30 are assembled adjacent to the platen 31 the raised portion 32 co-operating with the groove 33 to form a transfer chamber and rubber is injected through the passages 34 to fill the transfer chamber so formed. Beads 37 assembled with apices 38 are placed in position on the moulding faces 36 of the sidewall units.

At stage (B) a pair of moulding press platens 39 with moulding faces 40 are brought into intimate contact with the sidewall units 30 to form sidewall moulding cavities 41. Pressure is then applied by the moulding press to force the rubber from the transfer chambers through the passages 42 into the sidewall moulding cavities 41.

The moulding press platens 39 each contain sprue grooves (not shown) adjacent their moulding faces 40.

At stage (C) the mould is pressurized or a chamber containing the mould is pressurized and the moulding press platens 39 are lifted from the sidewall units 30. The provision of sprue grooves in the platens 39 effectively prevents air getting between the moulded sidewall and the face 40 and assists in holding the moulding to the platen so that the moulded sidewalls are lifted away from the sidewall units and carried by the press platens.

The sidewall units 30 and center platen 31 are then removed ready to be used again for stage (A).

In stage (D) a breaker assembly is built up on a former 43.

In stage (E) the former 43 is clamped between a pair of press platens 44 and 45 together with a ring 46 which is concentric with the breaker former. The ring 46 carries a tread pattern on its interior face and the ring 46 breaker former 43 and upper press platen 45 together define a moulding cavity for a tread portion of a tire. An angled face 47 is provided on the former 43 and a corresponding one 48 on the upper platen 45 so that the tread portion is moulded with angled side faces to be joined with matching faces on the moulded sidewalls.

The ring 46 contains passages 50 leading from a screw injector unit 49 to the interior face of the ring and the rubber forming the tread portion is thus injected into its moulding cavity.

In stage (F) after moulding the mould platens 44 and 45 are disengaged from the moulded tread portion, air pressure being introduced into the mould. The breaker former 43 is removed and the ring 46 detached from the injector unit 49. It may not be necessary to provide a separate locking sprue for the tread portion of the tire since the tread portion carried on the tread ring can itself serve as the locking sprue.

It will be appreciated that in all the stages described up to this point the rubber has been worked by the screw injectors to a temperature at which it is mouldable but is below the temperature at which an appreciable rate of cure is begun. This temperature depends upon the shape of the rheometer plot of cure rate vs. temperature for the rubber compound used. In general these curves show an initial plateau on which the rate of cure remains very low but once a certain temperature, the "threshold temperature", is reached the rate of cure begins rapidly to increase. We have found that by careful control and planning of the stages (A) to (F) these can all be carried out with the rubber below the threshold temperature. Different rubbers can be used in different parts of the tire provided that their rheometer curves match sufficiently to enable them to cure together at an elevated temperature to give an adequate bond between them.

Stages (A), (B) and (C) may be performed at the same time as stages (D), (E) and (F) and in stage (G) the tread portion carried by the tread ring 46 is positioned between the moulding press platens 39 carrying the sidewalls. The moulding press platens are brought up to the tread ring so that the sidewalls and tread portions contact along annular angled faces. At this stage the rubber is still warm but below the threshold temperature. The temperature is now raised to cure the hitherto uncured rubber. If desired internal gas pressure, e.g. air or stream, may be introduced into the mould at this stage to press the tire firmly into the moulding surfaces during curing.

Finally, the mould platens are again separated, the cured tire is removed from the mould and the sprues cutaway.

The tread portion of the tire may if desired be produced with a concave inner face to blend more smoothly with the sidewall contour. In this case the former 43 on which the tread portion is moulded may be collapsible or may be covered with a shaped spacer ring of, e.g. a cured ethylene propylene rubber, which will permit the cylindrical former to be removed and will then readily be stripped from the interior of the tread.

In addition the angle and position of the joint between the tread portion and sidewalls need not be as shown in the drawings the essential factor being that the joint must be positioned so that the parts can be pressed or sheared together during the closing of the platens 39 on the tread ring 46 in stage (G).

Having now described our invention, what we claim is:

1. A method for the manufacture of a pneumatic tire having parts including beads, sidewalls and a tread portion reinforced by means of a breaker assembly, comprising the following steps:
   a. working curable but uncured rubber to an extent sufficient to destroy its nerve but not to start the rubber on to a curing cycle;
   b. preassembling a breaker assembly for the tread portion of the tire and positioning it in an annular mould cavity for the tread portion of the tire;
   c. forming the tire in three parts from said worked uncured rubber by forcing said rubber into annular mould cavities including the mould cavity for the tread portion of the tire in which said breaker assembly has been preassembled, and mould cavities for the sidewall and bead on each side of the tire, at least the sidewall and bead moulds each being provided with gas-tight locking spures to assist in maintaining a formed tire in a desired part of each of the latter moulds when the latter moulds are opened;
   d. opening the moulds for the tire parts, at least the moulds for the sidewalls being opened in a pressurized atmosphere such that gas under pressure flows between parts of the moulds for the sidewalls and is prevented by the gas-tight locking sprues from passing around one side of each of the formed tire sidewalls whereby the tire sidewalls are retained in desired parts of the sidewall moulds;
   e. reassembling the moulds for the tire parts into a tire mould to bring the tire parts into joining contact; and
   f. joining the parts of the tire under head and gas pressure.

2. A method according to claim 1 in which fabric reinforcements are included in the sidewalls of the tire.

3. A method according to claim 2 wherein said fabric reinforcements are cord reinforcements.

4. A method according to claim 1 in which a bead core is positioned in the cavity of the mould for moulding each sidewall prior to forming the sidewalls.

5. A method according to claim 1 in which the tread portion of the tire includes a reinforcement of high modulus polymeric material which is assembled around a core prior to the forming of the tread portion.

6. A method according to claim 1 wherein in at least one part of the tire a reinforcement is provided which extends out of the tire part being moulded to leave a flap of reinforcement extending from it, and the flap is held out of the way while its associated tire part is brought into contact with an adjacent tire part and subsequently pressed into contact with the adjacent tire part to bridge the junction between the parts before the rubber is cured.

7. A method according to claim 1 in which the rubber is selected from natural rubber, butyl rubber, SBR, neoprene, ethylene propylene rubber and nitrile rubber and mixtures thereof.

8. A method according to claim 1 in which the sidewall moulds are pressurized by at last 5 p.s.i. by allowing gas under pressure to enter over the equator of the sidewall mould cavities.

9. A method according to claim 1 in which male formers are used in conjunction with the sidewall mould cavities, the sidewall moulds being pressurized by at least 5 p.s.i. by introduction of compressed gas through the male formers.

10. A method according to claim 1 in which the pressurization of the sidewall moulds is commenced before opening the sidewall mould cavities and maintained until the sidewalls have been joined with other parts of the tire and cured.

11. A method according to claim 1 in which the locking sprues are so shaped as to resist movement of the tire part in each mould, and to ensure that compressed gas entering each mould during pressurization passes over a lip and on to the surface of the tire part which is to be stripped from its corresponding mould half and does not enter between the tire part and the wall of the cavity on which the tire part is to be carried.

12. A method according to claim 1 in which fabric reinforcement is positioned in the cavity of the mould for moulding sidewalls prior to forming the sidewalls.

13. A method according to claim 1 in which the tread portion of the tire includes a reinforcement of cord fabric which is assembled around a core prior to the forming of the tread portion.

14. A method according to claim 1 in which the mould for moulding the tread portion is pressurized with gas before the mould is opened.

15. A method according to claim 1 in which locking sprues are provided on the sidewall parts of the tire with tread portions serving as a locking sprue for the tread part.

16. A method according to claim 1 in which beads and bead cores are included with the sidewall parts of the tire.

17. A method according to claim 1 in which pressurization of the moulds is commenced before opening the mould cavities for the various parts of the tire and maintained until the parts have been joined and cured.

* * * * *